(12) United States Patent
Ureche et al.

(10) Patent No.: US 8,411,863 B2
(45) Date of Patent: Apr. 2, 2013

(54) FULL VOLUME ENCRYPTION IN A CLUSTERED ENVIRONMENT

(75) Inventors: Octavian T. Ureche, Renton, WA (US); Scott A. Brender, Kirkland, WA (US); Elden Theodore Christensen, Sammamish, WA (US); Rajsekhar Das, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1178 days.

(21) Appl. No.: 12/244,888

(22) Filed: Oct. 3, 2008

(65) Prior Publication Data

US 2010/0086134 A1    Apr. 8, 2010

(51) Int. Cl.
*H04L 9/00* (2006.01)
(52) U.S. Cl. ..................................... 380/277
(58) Field of Classification Search .................. 380/277
See application file for complete search history.

(56) References Cited

U.S. PATENT DOCUMENTS

| | | | |
|---|---|---|---|
| 6,336,171 B1 | 1/2002 | Coskrey, IV | |
| 6,678,828 B1 | 1/2004 | Pham et al. | |
| 7,174,021 B2 | 2/2007 | Krishnaswamy et al. | |
| 7,269,743 B2 | 9/2007 | Yagawa | |
| 2005/0034150 A1 | 2/2005 | Muraoka | |
| 2006/0005049 A1 | 1/2006 | Randell | |
| 2006/0155988 A1 | 7/2006 | Hunter et al. | |
| 2008/0082835 A1 | 4/2008 | Asher et al. | |

OTHER PUBLICATIONS

"Storage Media Encryption Key Management for Release", Retrieved at <<http://www.cisco.com/en/US/prod/collateral/ps4159/ps6409/ps4358/white_paper_c11-462423_ps6028_Products_White_Paper.html>>, Jul. 18, 2008, pp. 14.
"Encryption Strategies", Retrieved at <<http://www.sun.com/encryption/wp/encryption_strategies_wp.pdf>>, The Key to Controlling Data, White Paper, Oct. 2007, p. 8.
McGuire, Cynthia, "Securing Data At-Rest", Retrieved at <<http://research.sun.com/sunlabsday/docs.2008/ckm_preso.pdf>>, pp. 25.

*Primary Examiner* — Jacob Lipman

(57) ABSTRACT

Full volume encryption can be applied to volumes in a clustering environment. To simplify the maintenance of keys relevant to such encrypted volumes, a cluster key table construct can be utilized, where each entry of the cluster key table corresponds to an encrypted volume and comprises an identification of the encrypted volume and a key needed to access that volume. Keys can be protected by encrypting them with a key specific to each computing device storing the cluster key table. Updates can be propagated among the computing devices in the cluster by first decrypting the keys and then reencrypting them with a key specific to each computing device as they are stored on those computing devices. Access control requirements can also be added to the entries in the cluster key table. Alternative access control requirements can be accommodated by assigning multiple independent entries to a single encrypted volume.

20 Claims, 15 Drawing Sheets

FULL VOLUME ENCRYPTION IN A CLUSTERED ENVIRONMENT

BACKGROUND

Server computing devices, to protect against individual device failures, often operate in a clustered environment, where multiple server computing devices maintain equivalent access to multiple volumes of data. Should one of the server computing devices fail, another server computing device can assume the former's duties and server operations can resume with a minimum of downtime. Similarly, data in such a server cluster, is likewise often stored in a redundant manner, such that, should one volume of data experience a failure, the data would remain accessible through one or more other volumes. In such a manner, a clustered environment, with multiple computing devices each maintaining equivalent access to multiple volumes of data, can provide a greater measure of fault-tolerance.

Traditionally, the data contained within a volume of data, which is typically stored on a data storage hardware device, such as a hard drive, is protected from unauthorized access by the computer-executable instructions of the computing device to which the data storage device is communicationally coupled. If the data storage device were, however, to be communicationally decoupled from a host computing device having such protective computer-executable instructions, the data could be accessed and its security compromised. To prevent such unauthorized access of data, the notion of "full volume encryption" was developed, whereby all of the relevant data stored on a data storage device was stored in an encrypted manner. Consequently, even if such a data storage device were to be independently accessed, through a computing device having no executable instructions for the protection of the data, the data could, nevertheless, remain protected, since it would be physically stored in an encrypted manner.

To limit access to data protected through full volume encryption, the key used to decrypt the data can be protected, such as by a password, key card, or similar security device. Unfortunately, should a user lose access to such a security device, a new key would need to be generated. Such a new key would require that the data be encrypted in such a manner that the new key could decrypt it. Consequently, the creation of such a new key would entail the computationally expensive, and lengthy, process of decrypting the volume and, subsequently, reencrypting it in such a manner that the new key could decrypt it. To avoid such inefficiencies, a layer of indirection was added whereby the key that can decrypt the data is, itself, encrypted by another key. This second key is then protected by a security device. Should a user lose access to the security device, only the second key would need to be changed, requiring only the decryption, and subsequent reencryption, of the first key, and not of all of the data itself.

SUMMARY

Full volume encryption can be utilized in a clustered environment by providing the relevant decryption keys to each computing device within the clustered environment. In one embodiment, a table structure can be utilized to store the relevant decryption keys, with each row of the table corresponding to a particular encrypted volume. To protect the decryption keys stored within the table, each decryption key can be encrypted, and thereby protected, with a decryption key specific to the computing device on which the table is stored. Additionally, to facilitate the updating of the table to the multiple computing devices that comprise the clustered environment, an existing checkpointing service can be utilized that provides for the real-time synchronization of specific information across multiple computing devices.

In another embodiment, the table structure can further comprise, in addition to the relevant keys, other access control entities, such as access control requirements that can be provided to an underlying full volume encryption service. A single encrypted volume can be assigned multiple rows within the table structure, such that, so long as the access control requirements for any row are met, access to the encrypted volume can be provided. Should multiple simultaneous access control requirements be established for a given volume, such a volume can be assigned multiple access control requirements within a single row of the table structure, thereby preventing access to the encrypted volume unless all of the assigned access control requirements are met.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
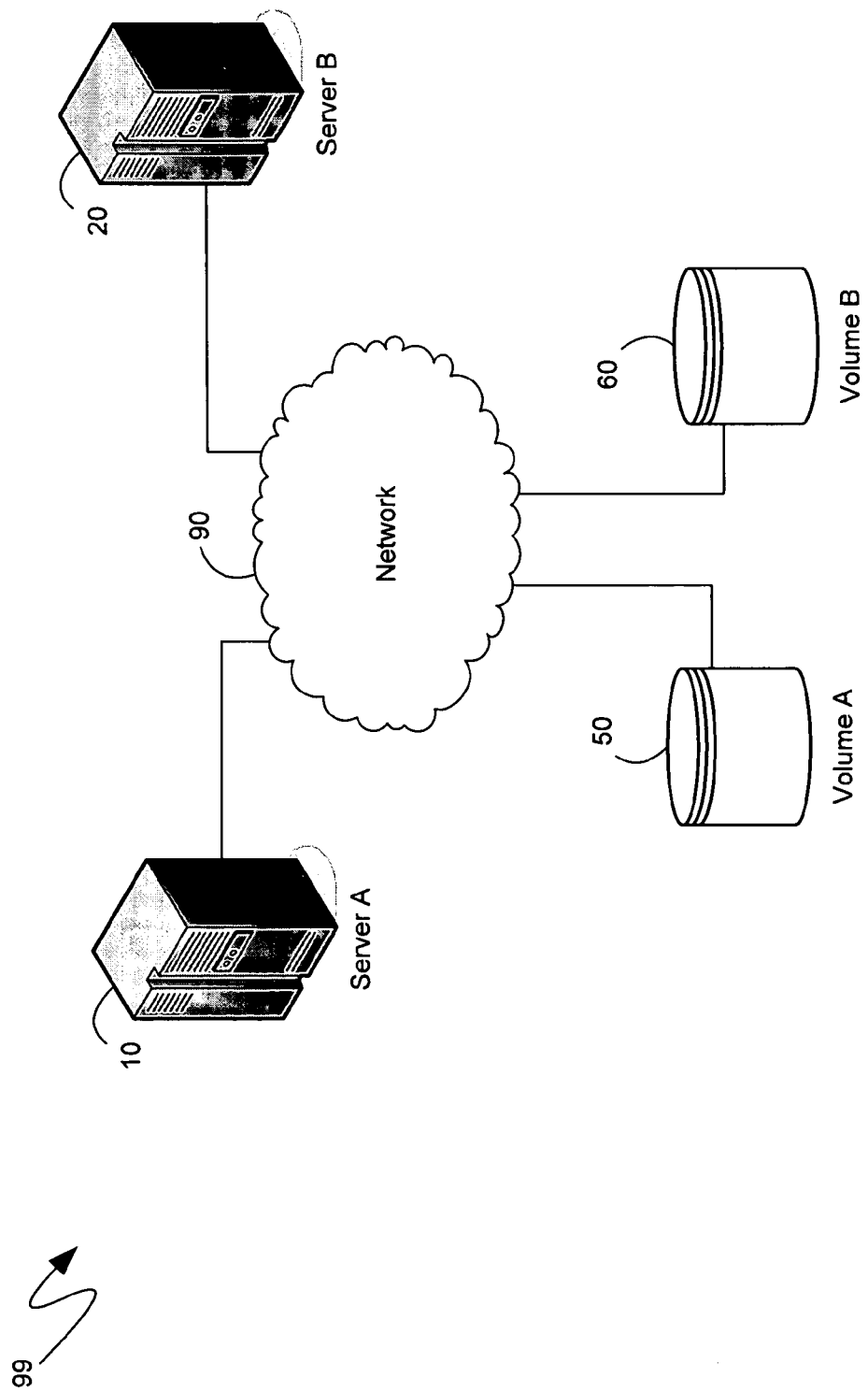
FIG. 1 is a block diagram of an exemplary clustered environment that provides context for the described functionality.

The following description relates to the maintenance and utilization of a table structure for the storage of decryption key and other information relevant to encrypted volumes within a clustered environment. A version of the table structure that is stored on a particular computing device of the clustered environment can comprise decryption keys that are encrypted, for protection, with a key specific to that particular computing device on which the table structure is stored. The table structure can further comprise, in addition to the keys, other access control entities, such as access control requirements for one or more encrypted volumes, thereby preventing access to the data of the encrypted volume unless each of the associated access control requirements are met. Multiple entries within the table structure can be associated with a single volume, thereby enabling access to that volume under multiple alternative conditions, such as alternative access control requirements.

The techniques described herein focus on, but are not limited to, the utilization of existing mechanisms directed to both full volume encryption and synchronization among multiple computing devices within a cluster, known as "checkpointing". However, while such mechanisms provide for efficiencies through the utilization of existing tools and technology, they can also introduce complexities that are not required by the fundamental concepts to which the descriptions below are directed. Consequently, while the descriptions below make reference to specific implementations that are designed to interface with these existing mechanisms, the scope of the descriptions themselves is not intended to be so limited.

Additionally, although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary network system 99 is illustrated comprising two computing devices 10 and 20, illustrated as server computing devices, and two volumes, namely volume A 50 and volume B 60, all communicationally coupled to one another through the network 90. As will be known to those skilled in the art, in a clustering environment, such as the cluster 99 of FIG. 1, multiple computing devices, such as server A 10 and server B 20 can simultaneously have access to both volume A 50 and volume B 60. Thus, if a computing device, such as server A 10, were to fail, the server B 20 can assume most or all of server A's operations since it has access to most or all of the data that server A had access to via its independent communicational connections to volume A 50 and volume B 60.

To facilitate the exchange and synchronization of relevant information between server A 10 and server B 20, one or more checkpointing mechanisms can be utilized. As will be known by those skilled in the art, checkpointing mechanisms can provide for the automated, and possibly even real-time, replication of relevant data between computing devices, such as server A 10 and server B 20. Thus, for example, if server A 10 were hosting or executing a set of computer-executable instructions that had retained relevant information in server A's memory, or in a specific location, such as server A's registry, such relevant information could be copied, to server B 20, by checkpointing mechanisms, thereby ensuring that, should server A fail, server B could resume the execution or hosting of such computer-executable instructions without requiring those instructions to regenerate all of the previously retained relevant information.

Existing checkpointing mechanisms can seek to synchronize specific types of data between computing devices, such as server A 10 and server B 20. For example, one type of existing checkpointing mechanism can seek to synchronize specific portions of the operating system registry database, or similar operating system data storage construct, between computing devices. To make use of such existing checkpoint mechanisms, data that is to be synchronized between computing devices can be stored in those locations, or within those constructs, that the specific, existing checkpointing mechanism is directed to.

Figure 2:
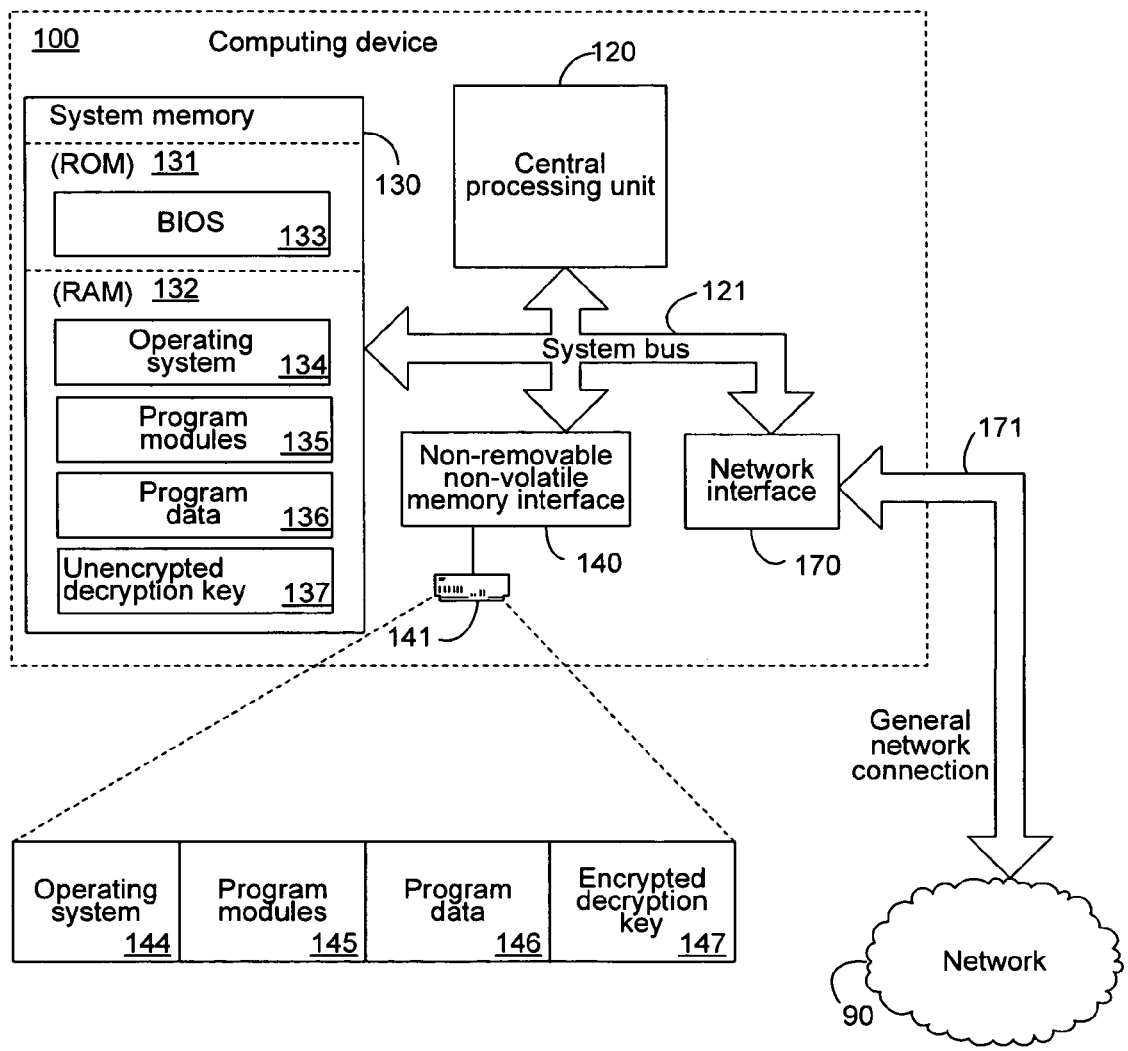
FIG. 2 is a block diagram of an exemplary computing device.

Before proceeding with the descriptions below, which are directed to the maintenance and utilization of a table structure that can, in one embodiment, be synchronized via one or more existing checkpointing mechanisms, a more detailed description of an exemplary computing device, such as computing devices 10 or 20 is provided. Turning to FIG. 2, therefore, an exemplary computing device 100 is illustrated that can represent any of the computing devices 10 or 20 shown in FIG. 1, as well as any of the computing devices referenced below. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

The computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Of relevance to the descriptions below, one or more of the computer storage media communicationally coupled to computing device 100, such as the hard disk drive 141, may comprise computer readable instructions and data structures that can be encrypted for additional protection. In such a case a decryption key can be utilized by the computing device 100 or, more specifically, by authorized computer readable instructions executing on the computing device, to decrypt and access the computer readable instructions and data structures that are stored in an encrypted form. Traditionally, such a decryption key would be stored in a protected, and encrypted, form, such as the encrypted decryption key 147. When utilized by computer readable instructions executing on the computing device 100, such an encrypted decryption key 147 can be decrypted and retained in an unencrypted state, such as, for example, the unencrypted decryption key 137 resident in the RAM 132 of FIG. 2.

A full volume encryption methodology can be applied to one or more of the computer storage media communicationally coupled to computing device 100, such as the hard disk drive 141. In such a case, all of the relevant information stored on the hard disk drive can be stored in an encrypted state. For ease of reference, the key utilized to encrypt and decrypt such information, within the context of full volume encryption, will be referred to herein as the "full volume encryption key" (FVEK). The FVEK can be retained in an encrypted state, such as the encrypted decryption key 147, and can be decrypted after an appropriate set of information, such as a password, person identification number (PIN), keycard, or other such security information, is provided. More specifically, the FVEK can be encrypted by a key that is associated with such security information. Unfortunately, should such security information become lost, forgotten, or otherwise rendered unavailable, the FVEK will not be able to be retrieved. In such a case an emergency FVEK can be utilized to decrypted the information stored on the hard disk drive and a new FVEK can be utilized to reencrypt it all.

Of course, the process of decrypting all of the contents of a storage device, such as the hard disk drive 141, and then reencrypting them can be inefficient. To avoid such inefficiencies, an intermediate encryption key can be utilized. For each of reference, such an intermediate key will be referred to herein as a "volume master key" (VMK). With such a VMK, the FVEK can continue to be utilized to encrypt and decrypt the information stored on, for example, the hard disk drive 141. The FVEK, however, can be encrypted by the VMK and can be stored in an encrypted state, such as the encrypted decryption key 147. The VMK, in turn, can also be encrypted, such as by a key that can be associated with security information, such as a password, PIN, or keycard. If such security information was lost or forgotten, then an emergency VMK can be utilized to decrypt the FVEK and a new VMK can be created and the FVEK can be reencrypted with that new VMK. Since only the FVEK, as opposed to the entire volume, needs to be decrypted and then reencrypted with a new key, the process of recovering from lost or forgotten security information can be greatly optimized.

Figure 3:
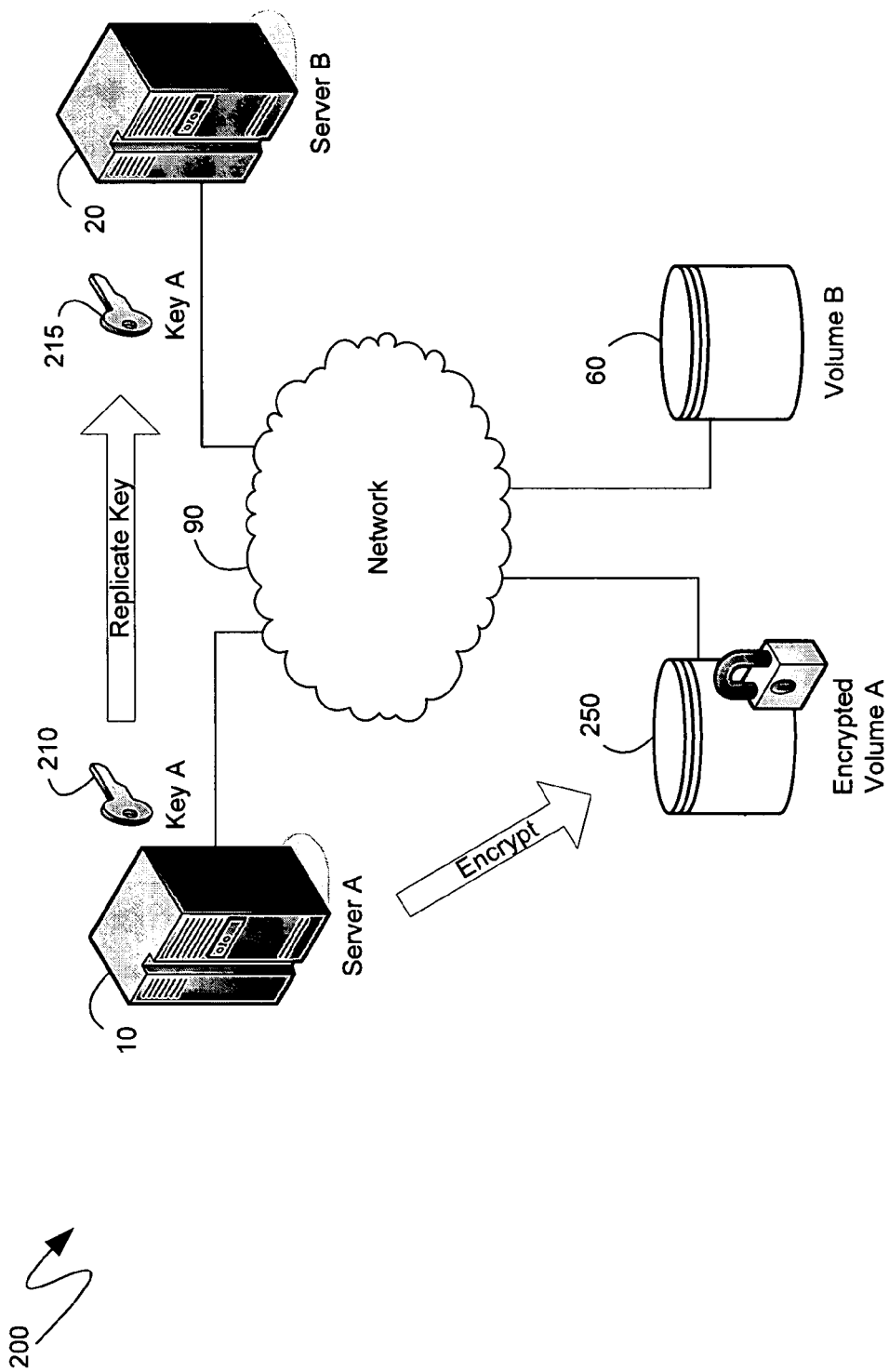
FIG. 3 is a block diagram of an exemplary full volume encryption of one volume within a clustered environment.

Turning to FIG. 3, a system 200 illustrates a simplified example of a full volume encryption being applied to a volume in a clustered environment. Specifically, volume A 50 from system 99 is shown as being encrypted by the server A 10, thereby causing it to become encrypted volume A 250. The key A 210 associated with the encrypted volume A 250 can be retained by the server A 10 and can, as illustrated in FIG. 3, be copied to the server B 20 as server B's copy of key A 215 to enable server B to access the same information as server A should, for example, server A fail.

Figure 4:
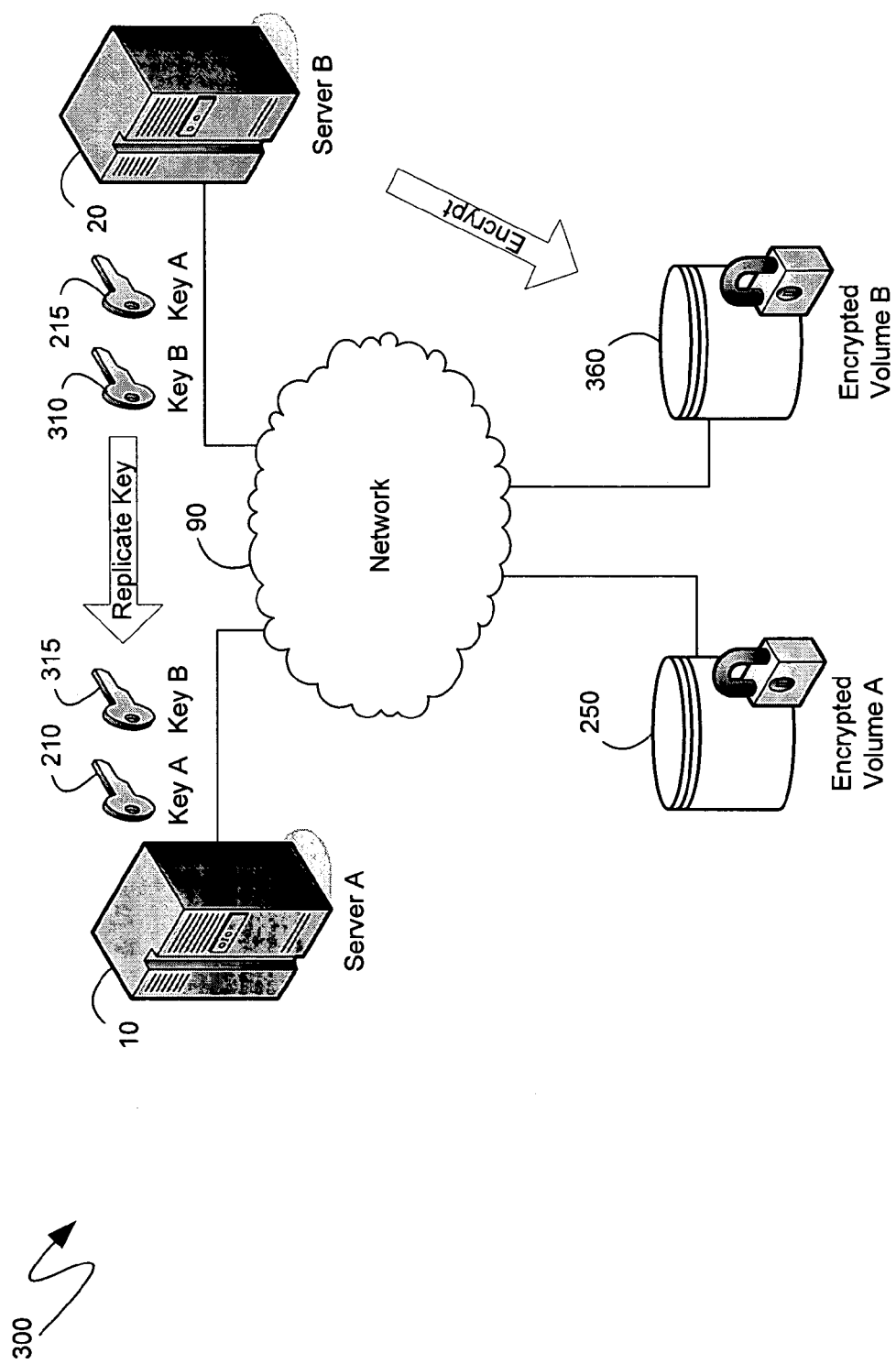
FIG. 4 is a block diagram of an exemplary full volume encryption of another volume within a clustered environment.

If volume B 60 were also to be encrypted with a full volume encryption methodology, such as that shown in system 300 of FIG. 4, then two keys would need to be maintained by each of the server A 10 and server B 20. In the specific example illustrated by system 300, volume B 60 of system 99 is shown as being encrypted by the server B 20, thereby causing it to become encrypted volume B 360. The relevant key B 310 can be retained by the server B 20 and copied to the server A 10, as key B 315, to enable server A to access the encrypted volume B 360.

As can be seen, the maintenance of keys for various encrypted volumes, can become unwieldy. Additionally, the keys of systems 200 and 300 are illustrated as being exchanged without protection. Should the keys be encrypted, additional decryption keys could be exchanged, or a decryption and reencryption step could be utilized. To simplify such key management within a clustered environment that comprises one or more encrypted volumes, a table structure can be utilized. In one embodiment such a table structure can comprise at least one entry for each encrypted volume, with each entry comprising an identification of the encrypted volume and a relevant encryption key for the volume to provide for the encryption and decryption of data to and from the encrypted volume.

Figure 5:
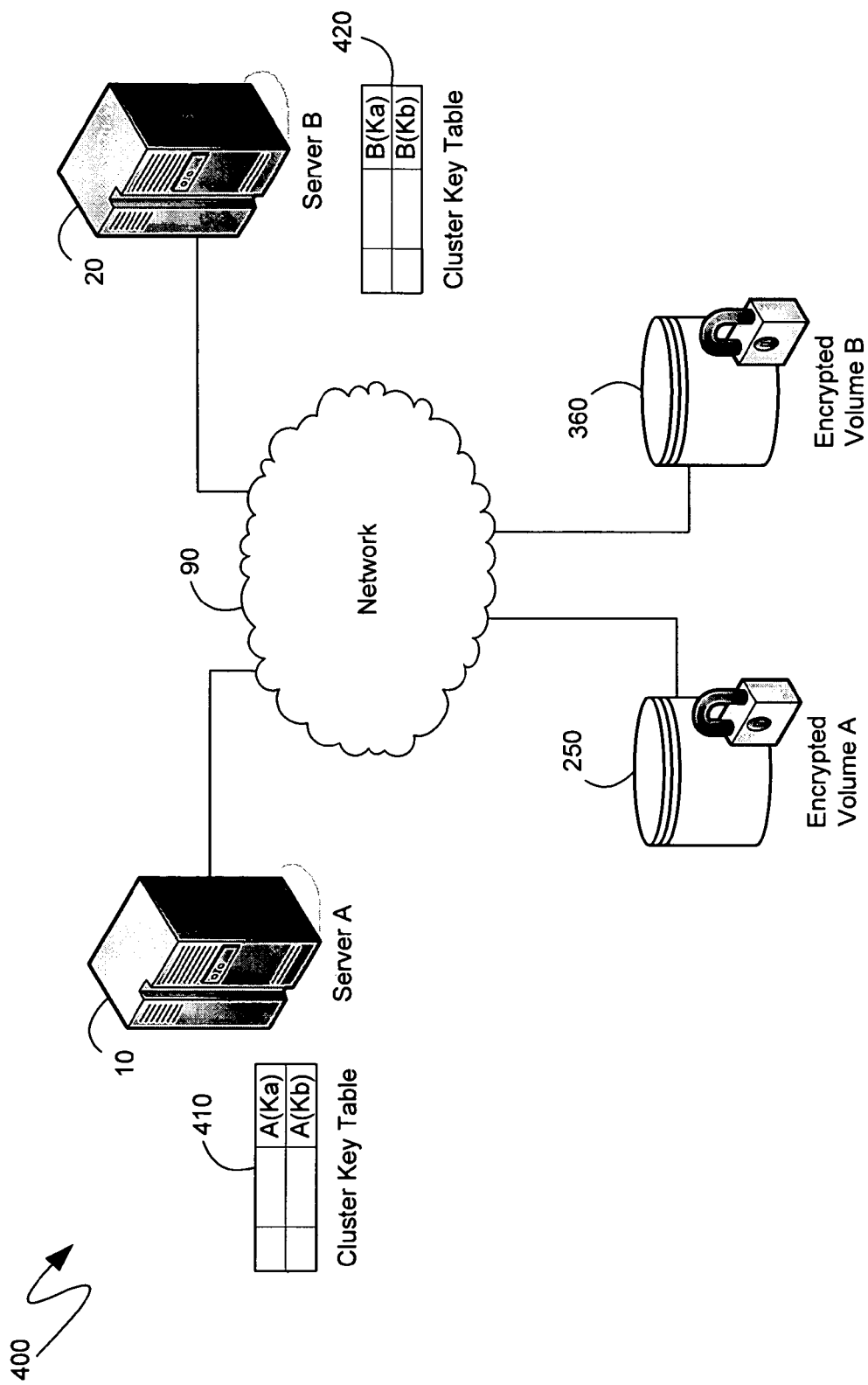
FIG. 5 is a block diagram of a utilization of an exemplary table structure for storing full volume encryption keys within a clustered environment.

Turning to FIG. 5, a system 400 is illustrated comprising two "cluster key tables" (CKTs) 410 and 420. Each CKT can comprise entries that correspond to the encrypted volume A 250 and the encrypted volume B 360. Specifically, as shown, a first entry in the CKT 410 can comprise a key for encrypted volume A 250, abbreviated "Ka", and a second entry in the CKT can comprise a key for encrypted volume B 360, abbreviated "Kb". In one embodiment, to protect such keys, they can be stored in the CKT in a protected, or encrypted, state. To enable server A 10 to access the keys for encrypted volume A 250 and encrypted volume B 360, their keys, as stored in server A's copy of the CKT 410, can be encrypted with an encryption key that is specific to server A, and accessible to server A. Consequently, the key for encrypted volume A 250, abbreviated "Ka" in the CKT 410 is shown as being encrypted by an encryption key specific to server A 10 by the shorthand notation "A(Ka)". Similarly, the key for encrypted volume B 360, abbreviated "Kb" in the CKT 410 is shown as being encrypted by the same server A 10 specific encryption key, again indicated by the shorthand notation "A(Kb)". Conversely, the CKT 420 stored with server B 20 indicates that the key for encrypted volume A 250 is encrypted by an encryption key specific to server B by the shorthand notation "B(Ka)" and the key for encrypted volume B 360 is shown as being encrypted by the same server B specific encryption key, again indicated by the shorthand notation "B(Kb)".

In one embodiment, existing full volume encryption methodologies and mechanisms can be leveraged to minimize the additional effort required to provide support for a table structure, such as the CKTs 410 and 420 of FIG. 5. As indicated previously, in some existing full volume encryption mechanisms, an initial key, referred to herein as the FVEK, can be protected by a subsequent key, referred to herein as a VMK to provide for efficient recovery from lost or forgotten security information, such as a password, PIN or keycard that can be associated with one or more keys that are used to protect the VMK. In an embodiment leveraging such existing full volume encryption mechanisms, the VMK can be protected, not by some security information that may need to be entered or provided by a user, but rather by an automatic key that can be automatically used by an unattended computing device, such as server A 10 or server B 20 to decrypt the relevant keys and ultimately access the encrypted volume. Such an automatic key, which will be referred to herein as an "automatic unlock key" or AUK can take the place of a password or PIN in the existing full volume encryption mechanisms, such that a computing device, such as the server A 10, could simply invoke the existing full volume encryption mechanisms and, instead of providing a password or PIN, could simply provide an AUK to cause the existing full volume encryption mechanisms to decrypt data from the encrypted volume and provide such a computing device with access to it.

The CKT, such as CKT 410 or CKT 420, shown in FIG. 5, can store, as a key associated with an encrypted volume, such as the encrypted volume A 250 or the encrypted volume B 360, an appropriate AUK for such volumes. As indicated previously, and as shown in FIG. 5, such a key can itself be protected. For ease of reference, the key with which the AUK can be encrypted and protected will be referred to herein as the "global auto unlock key" (GAUK). Each computing device of a cluster, such as the server A 10 and the server B 20 of FIG. 5 can have access to their own specific GAUKs. In one embodiment, such GAUKs can be derived from information specific to each computing device, such as information maintained by a Trusted Platform Module (TPM) on each computing device, or information generated locally on each computing device, such as by a full volume encryption mechanism directed to a local volume of such a computing device.

The AUK, because it can be selected individually for each VMK can be specific to each encrypted volume. Thus, for example, the encrypted volume A 250 of FIG. 5 can have a different VMK and, consequently, a different AUK, than the encrypted volume B 360. Conversely, a GAUK can be specific to a computing device, such as the server A 10 or the server B 20. As shown in FIG. 5, the CKT 410 and the CKT 420 can comprise AUKs for encrypted volume A 250 and encrypted volume B 360, as indicated by the shorthand notation "Ka" for the AUK of encrypted volume A and "Kb" for the AUK of encrypted volume B. As also shown in FIG. 5, the CKT 410 stored on server A 10 can have each of those AUKs protected by server A's GAUK, as indicated by the shorthand notation "A(Ka)" for the AUK of encrypted volume A 250 that is encrypted by server A's GAUK and the shorthand notation "A(Kb)" for the AUK of encrypted volume B 360 that is, again, encrypted by server A's GAUK. Similarly, the CKT 420 stored on server B 20 can have each AUK protected by server B's GAUK, as indicated by the shorthand notation "B(Ka)" and "B(Kb)".

In one embodiment, the CKT, such as CKT 410 and CKT 420, can comprise additional information that can be retained in the CKT to provide for improved efficiency. For example, in addition to comprising volume-specific keys, such as the AUKs, each protected by a computing-device-specific GAUK, and an identification of the relevant encrypted volume, the CKT can also comprise a textual path to the volume, a unique identifier of each AUK, and an index to provide for easier referencing within the CKT.

In another embodiment, the CKT, such as CKT 410 and CKT 420, can be stored by their respective computing devices, namely server A 10 and server B 20 in the specific example of FIG. 5, in particular locations that can enable the utilization of existing checkpointing services. For example, some existing checkpointing services seek to replicate specific portions of the operating system registry database, or similar operating system data retention construct. In such a case, the CKT can be stored in appropriate portions of each individual computing device's operating system registry, or similar data retention construct. When so stored, changes to the CKT on one computing device can be propagated to other computing devices via the existing checkpointing mechanisms.

The propagation of CKT updates, or the synchronization of the CKT, to multiple computing devices can enable modifications to the CKT to account for new volumes or computing devices within the clustered environment or changes to existing clustered volumes. FIGS. 6 through 15, described in detail below, provide illustrations of the following functionality as related to the changes to, and maintenance of, the CKT structure: the addition and encryption of a new volume, the addition of an already encrypted volume, the removal of an encrypted volume, the decryption of an encrypted volume, and the addition of a new computing device.

Figure 6:
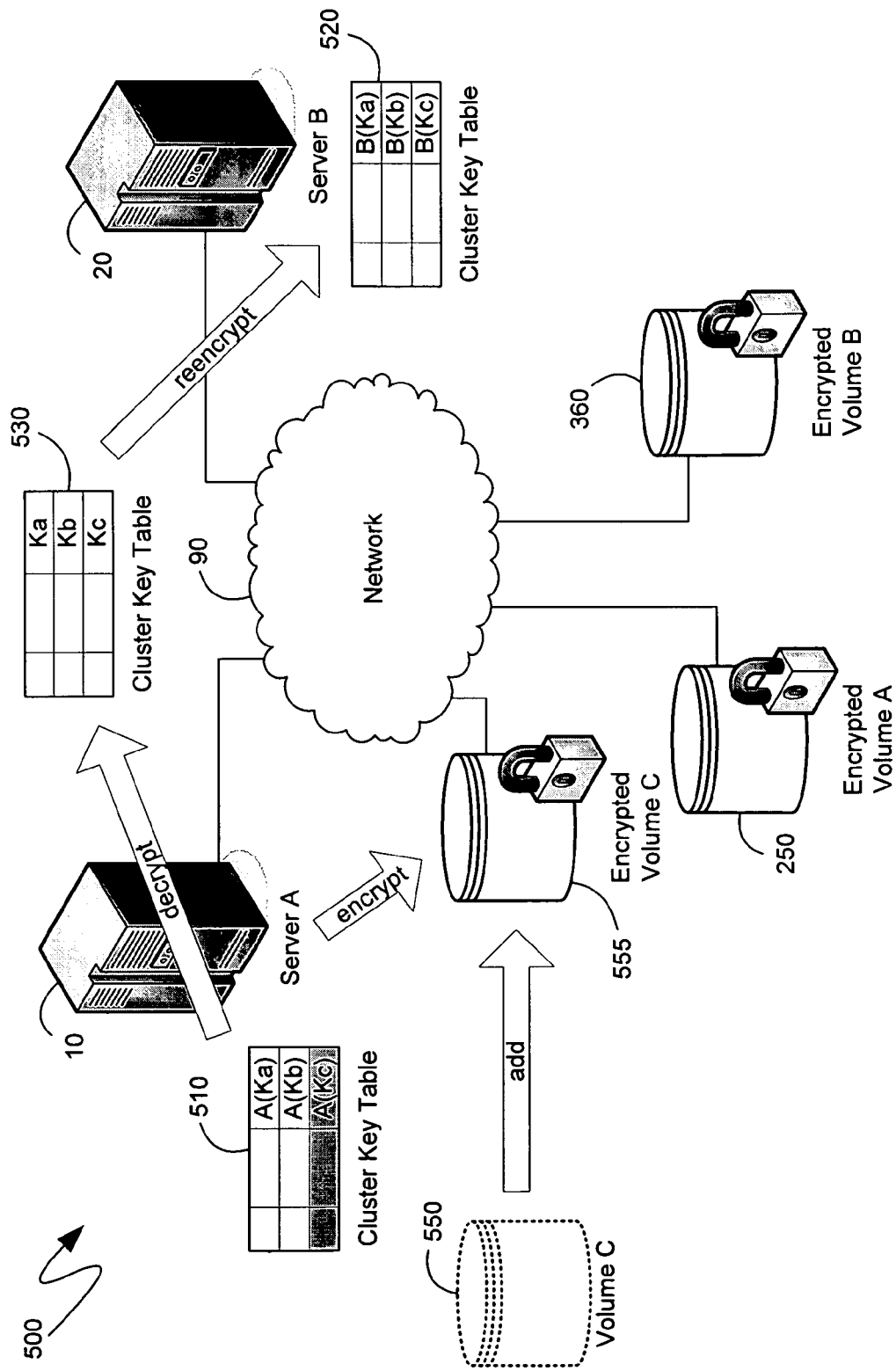
FIG. 6 is a block diagram of an exemplary addition and full volume encryption of a volume within a clustered environment utilizing a table structure for storing decryption keys.

Turning to FIG. 6, the system 500 illustrates the addition of a new volume C 550 to the existing cluster and the encryption thereof by server A 10, thereby rendering it encrypted volume C 555. In one embodiment, when a new volume, such as volume C 550 is connected to the cluster and encrypted, the encrypting computing device, namely server A 10 in the example illustrated in FIG. 6, can add an additional entry into the CKT maintained by that computing device. Thus, as shown in FIG. 6, the CKT 410 maintained by server A 10 from FIG. 5 is modified into CKT 510 comprising an additional entry for the encrypted volume C 555. As with the other entries described previously, the newly added entry can comprise a key for the encrypted volume C 555, shorthanded as "Kc" in CKT 510, which can be encrypted by a key specific to server A 10, shorthanded "A(Kc)" in CKT 510. As indicated previously the key for the encrypted volume C 555 can be an AUK, and can be stored in the CKT 510, as with the other AUKs stored therein, in an encrypted form, having been encrypted by the GAUK of server A 10.

Subsequently, the server A 10 can request that the GAUK be used to decrypt some or all of the encrypted AUKs in the CKT 510 to generate an in-memory copy of the CKT, shown in FIG. 6 as CKT 530, where the AUKs are shown as being unencrypted. Such a copy of the CKT can then be transmitted or provided to one or more of the other computing device of the cluster, such as the server B 20 of FIG. 6. In one embodiment, the entire CKT structure 530 can be transmitted or provided to server B 20. In another embodiment, only the relevant entries of the CKT structure 530 can be provided to the server B 20, thereby avoiding the addition resources, and potential security implications, of transmitting the entire CKT structure 530. When CKT 530, which can be either the whole structure, or only the changed entries, as indicated, is provided to the server B 20, the server B can request that the AUKs in the CKT 530 are reencrypted with server B's GAUK. Thus, as shown, with shorthand notation, the decrypted keys "Ka", "Kb" and "Kc" of CKT 530 are reencrypted with server B's GAUK and stored as "B(Ka)", "B(Kb)" and "B(Kc)" in the CKT 520. In such a manner, the updated version of the CKT 510 updated by, and stored at, server A 10 can be propagated to another computing device of the cluster, such as the server B 20.

Figure 7:
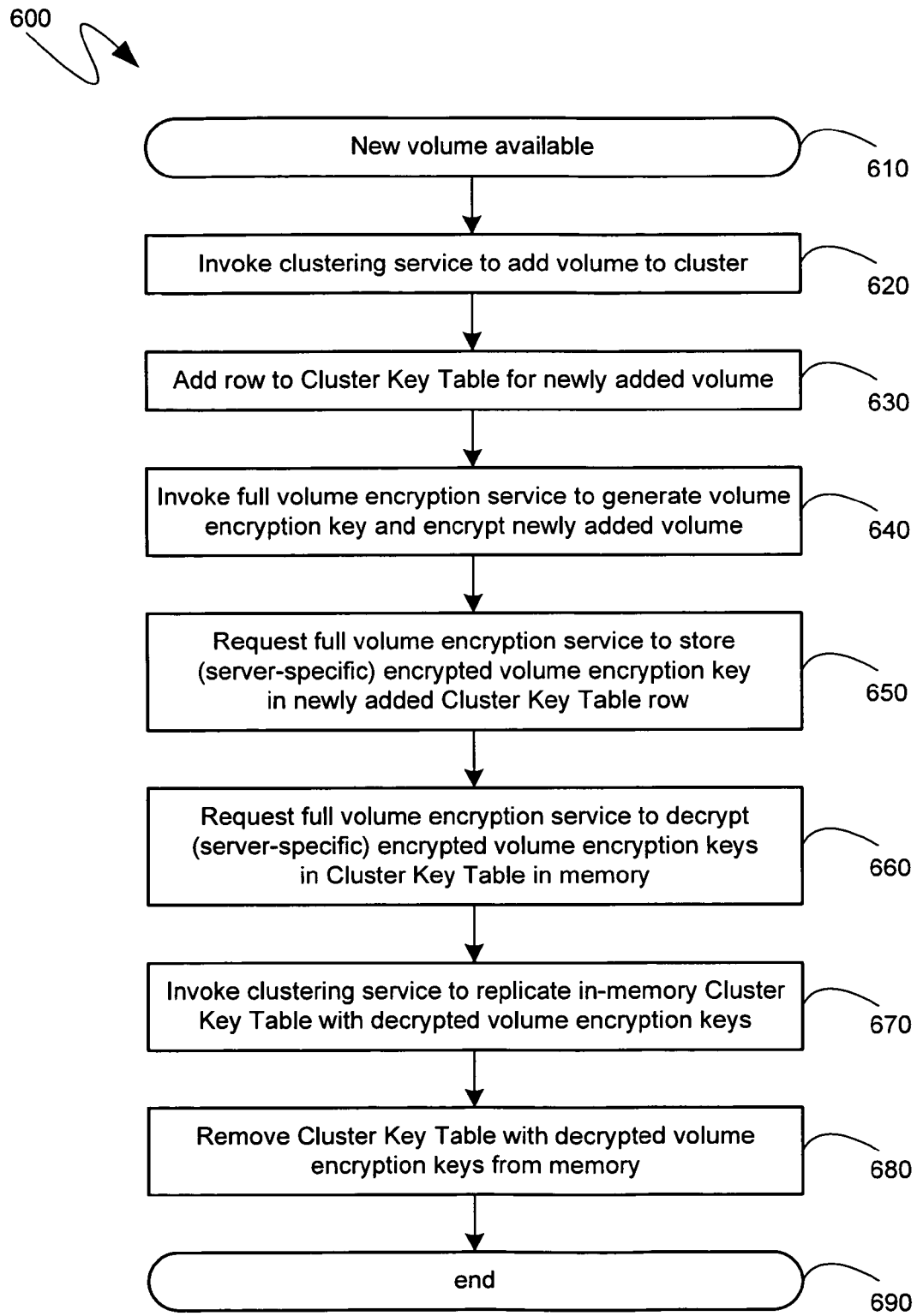
FIG. 7 is a flow diagram of an exemplary addition and full volume encryption of a volume within a clustered environment utilizing a table structure for storing decryption keys.

Turning to FIG. 7, a flow diagram 600 illustrates the above described addition and encryption of a new volume in greater detail. As can be seen from the flow diagram 600, initially, at step 610, a new volume can become available to the cluster. At step 620, a clustering service can be invoked to add the new volume to the cluster. As will be known to those skilled in the art, such a clustering service can perform relevant low level tasks, such as ensuring that the operating system of each computing device of the cluster is appropriately made aware of the existence and location of the newly added volume. Subsequently, at step 630, a new entry can be made to the CKT on the computing device that will invoke an existing encryption service to encrypt the new volume. Such an invocation can occur at step 640, though, in other embodiments, steps 630 and 640 can be reversed in order, or performed simultaneously.

As indicated, existing full volume encryption services can be utilized to encrypt the newly added volume at step 640. As a result of such an encryption, the newly encrypted volume can have a key associated with it. In one embodiment, such a key can be an FVEK, which can then be protected by a VMK for the reasons described above. The VMK can, in turn, be protected by an AUK, also for the reasons described above, and, at step 650, a request can be made to the full volume encryption service to provide, or store, into the CKT a key, such as the AUK, that can be encrypted with a key specific to the computing device making the request. In one embodiment, the AUK can be encrypted with a GAUK which, as indicated previously, can be specific to each computing device in the cluster.

Subsequently, at step 660, the full volume encryption service can be requested to decrypt some or all of the keys stored in the CKT to generate an in-memory version of the CKT without the protection of, for example, the GAUK. As indicated previously, in one embodiment, the entire CKT structure can be transmitted while, in another embodiment, only the changed entries can be transmitted. Irrespective of the precise data transmitted, a clustering service can then, at step 670, be invoked to perform a checkpointing or other relevant updating or synchronization of the in-memory CKT to the other computing devices of the cluster. For security, the in-memory CKT, with decrypted encryption keys, can be removed at step 680, and the relevant processing can end at step 690. In such a manner, existing mechanisms can be utilized to add a new volume to a cluster, and encrypt it.

Figure 8:
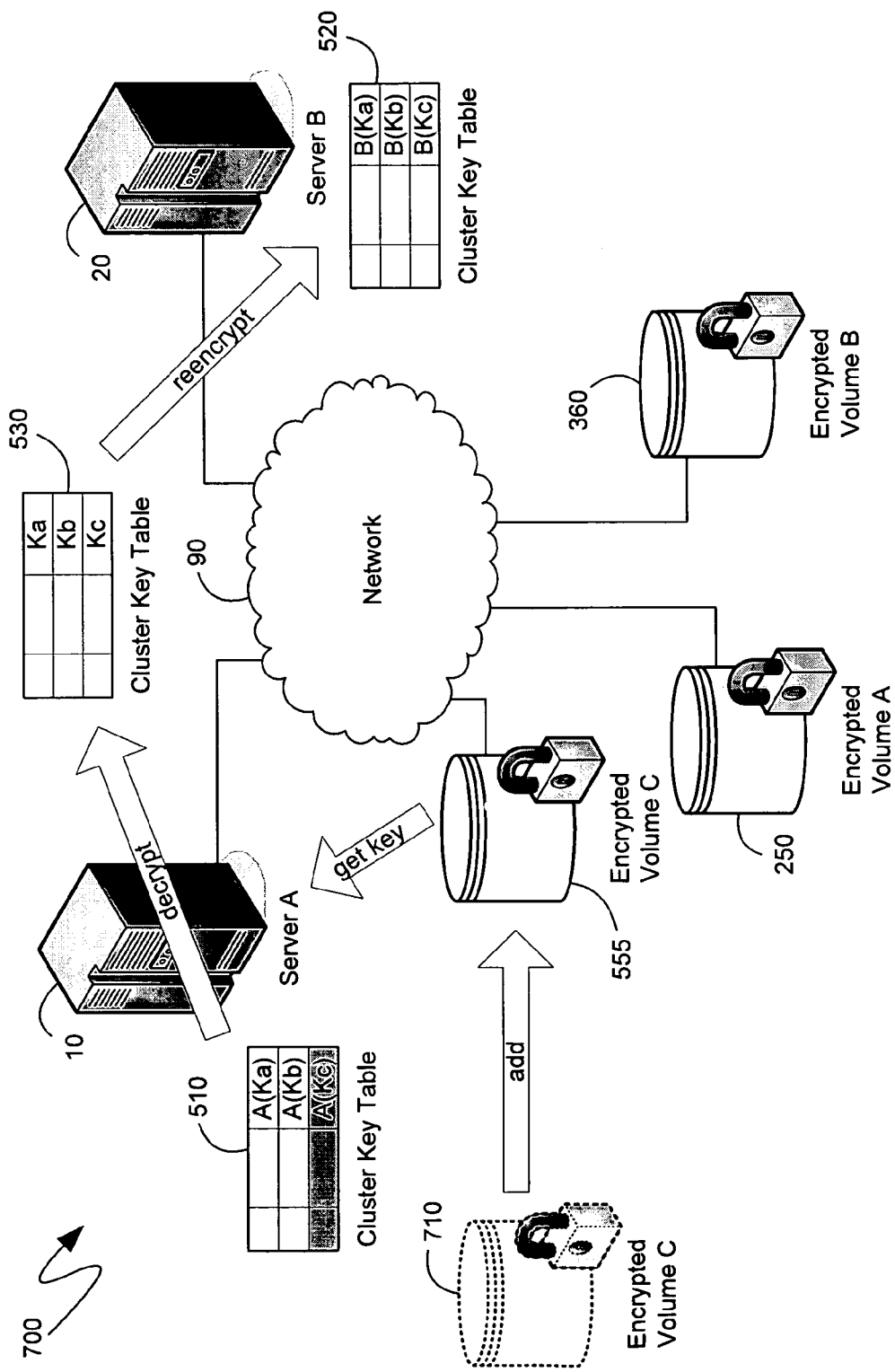
FIG. 8 is a block diagram of an exemplary addition of a full volume encrypted volume within a clustered environment utilizing a table structure for storing decryption keys.

Turning to FIG. 8, the addition of an already encrypted volume C 710 to a cluster is illustrated by system 700. The addition of such an already encrypted volume C 710 is similar to the addition of an encrypted volume, such as volume C 550, described above. Indeed, the encrypted volume C 555 as connected to the network 90, and the resulting CKT 510 created by server A can be equivalent and, as such, are given the same reference numerals in FIG. 8 as in FIG. 6. One difference, however, as shown, is that a computing device, such as, for example, server A 10, need not request that the encrypted volume C 555 be encrypted, but rather can simply request a relevant decryption key associated with the encrypted volume C. Server A 10 can then, as described above, update the CKT 410 to the CKT 510, with the additional information regarding encrypted volume C 555, as shown. Server A 10 can also, as shown, cause the updating of other computing devices' CKTs, such as the CKT 520 of server B 20, via the unencrypted version of the CKT 530, in the manner also described above. Again, as indicated previously, the CKT 530 can, in one embodiment, comprise only the changed entries, in which case the recipient, such as server B 20, can incorporate the changes indicated by the CKT 530 with its previously existing CKT copy.

Figure 9:
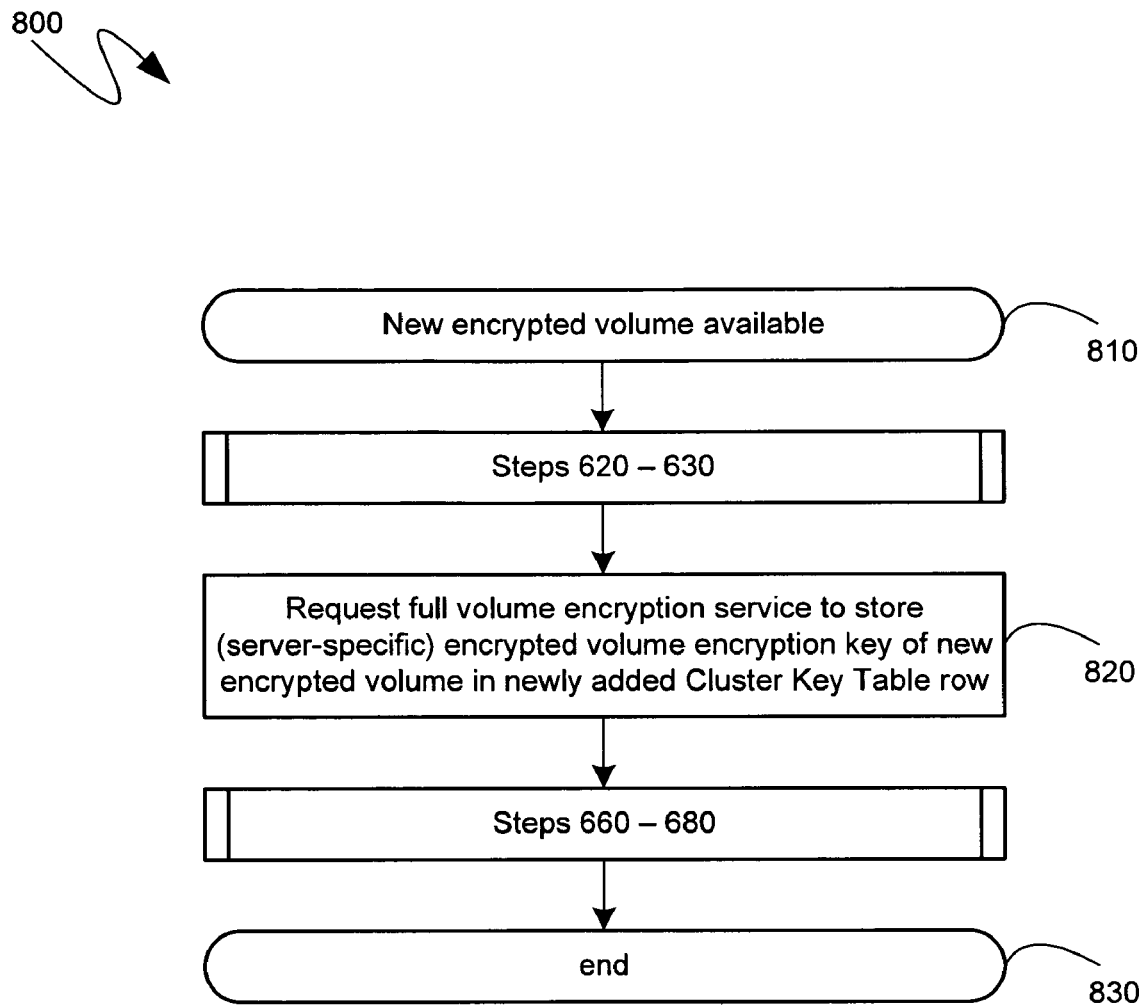
FIG. 9 is a flow diagram of an exemplary addition of a full volume encrypted volume within a clustered environment utilizing a table structure for storing decryption keys.

More specifically, and with reference to the flow diagram 800 of FIG. 9, when a new encrypted volume becomes available at step 810, processing can proceed with the previously described steps 620 and 630, whereby the appropriate mechanisms are invoked to add the new encrypted volume to the cluster and whereby a new entry is added to the CKT. Subsequently, at step 820, a full volume encryption service, or similar service, can be directed to obtain, from the new encrypted volume, and store, in an encrypted state in the CKT, a key that can be utilized to access information on the encrypted volume. For example, the full volume encryption service can obtain a VMK from the already encrypted volume, generate an AUK to enable the server to access the encrypted volume without requiring user input, and then encrypt the AUK with the server's GAUK and store that in the CKT. The new CKT can then be provided to other computing devices in the cluster via steps 660 through 680, as previously described, whereby the encrypted keys in the CKT are decrypted, the CKT, or the changed entries of the CKT are copied to other computing devices, and then the keys in the CKT, or the changed entries of the CKT, are reencrypted on those other computing devices with keys that are specific to those other computing devices. The relevant processing can then end at step 830.

Figure 10:
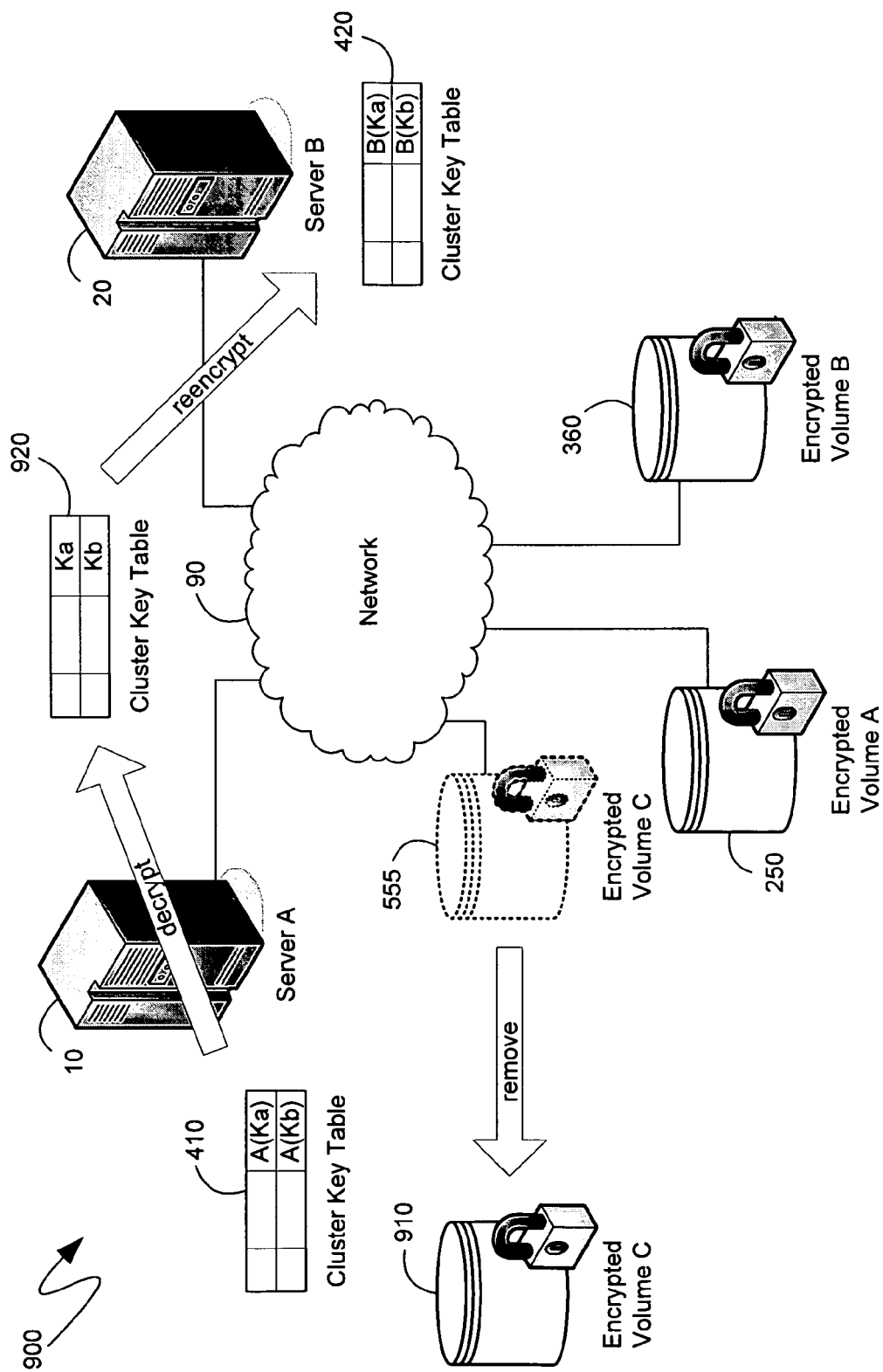
FIG. 10 is a block diagram of an exemplary removal of a full volume encrypted volume from a clustered environment utilizing a table structure for storing decryption keys.

Turning to FIG. 10, a system 900 illustrates the removal of encrypted volume 555 from the cluster, thereby rendering it a stand-alone encrypted volume C 910. As a result of such a removal a computing device, such as server A 10, can remove the relevant entry from the CKT, thereby returning CKT 510 to the CKT 410 illustrated and described previously. As before, to provide such a modified CKT 410 to other computing devices of the cluster, such as server B 20, a CKT 920, with decrypted keys, can be generated and provided to the other computing devices, and then the keys can be reencrypted with a key specific to each computing device. Alternatively, rather than sending the CKT 920, in another embodiment, the server A 10 could just send an indication of which entries from the CKT were removed.

Figure 11:
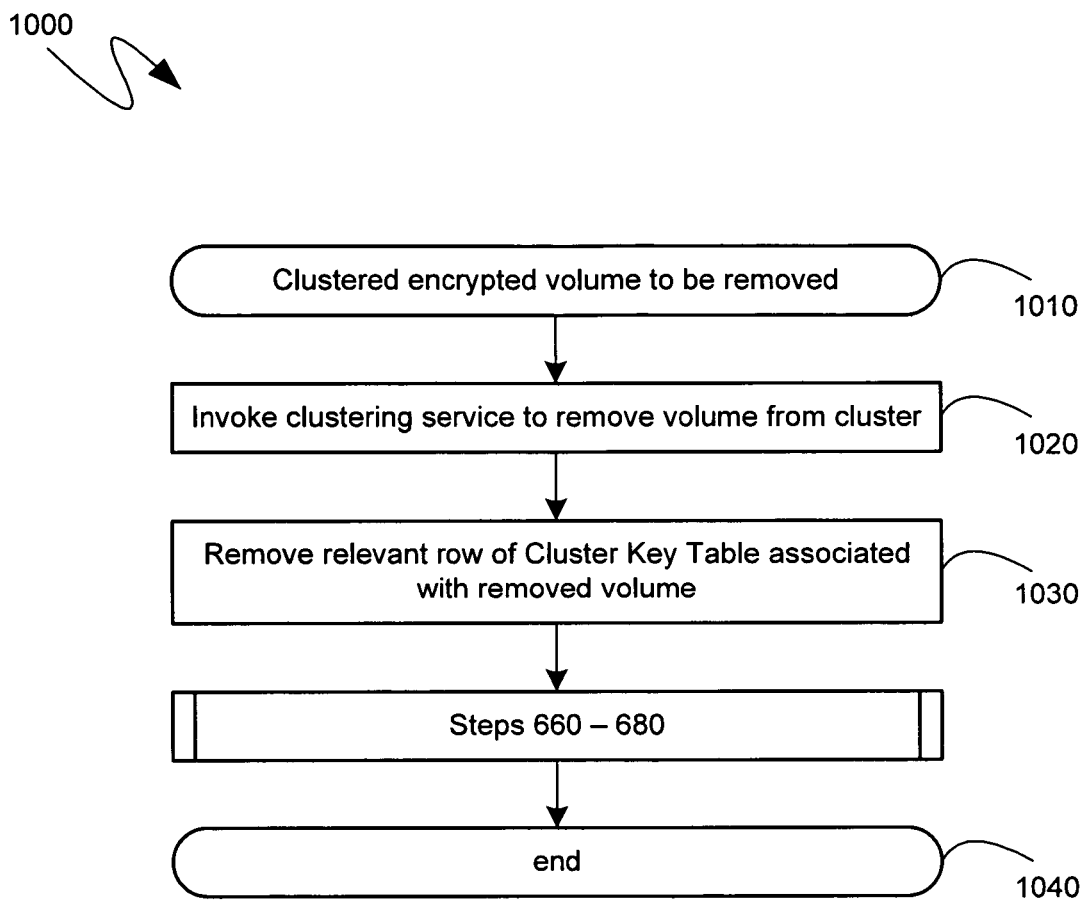
FIG. 11 is a flow diagram of an exemplary removal of a full volume encrypted volume from a clustered environment utilizing a table structure for storing decryption keys.

The flow diagram 1000 of FIG. 11 provides a more detailed illustration of the above steps. Specifically, at step 1010, a clustered encrypted volume can be selected for removal from the cluster. A clustering service, or similar mechanism, can be invoked at step 1020 to accomplish the actual removal, such as by notifying each of the computing devices in cluster of such a removal, or, for example, deleting the relevant information from operating system volume information on each computing device. Subsequently, at step 1030, the relevant entry from the CKT can be removed and the new, resulting, CKT can be transmitted or provided to the other computing devices via the above described and illustrated steps 660 through 680. Alternatively, as indicated, only the changed entries or, in this case, an identification of the removed entries, can be transmitted to the other computing devices. The relevant processing can then end at step 1040.

Figure 12:
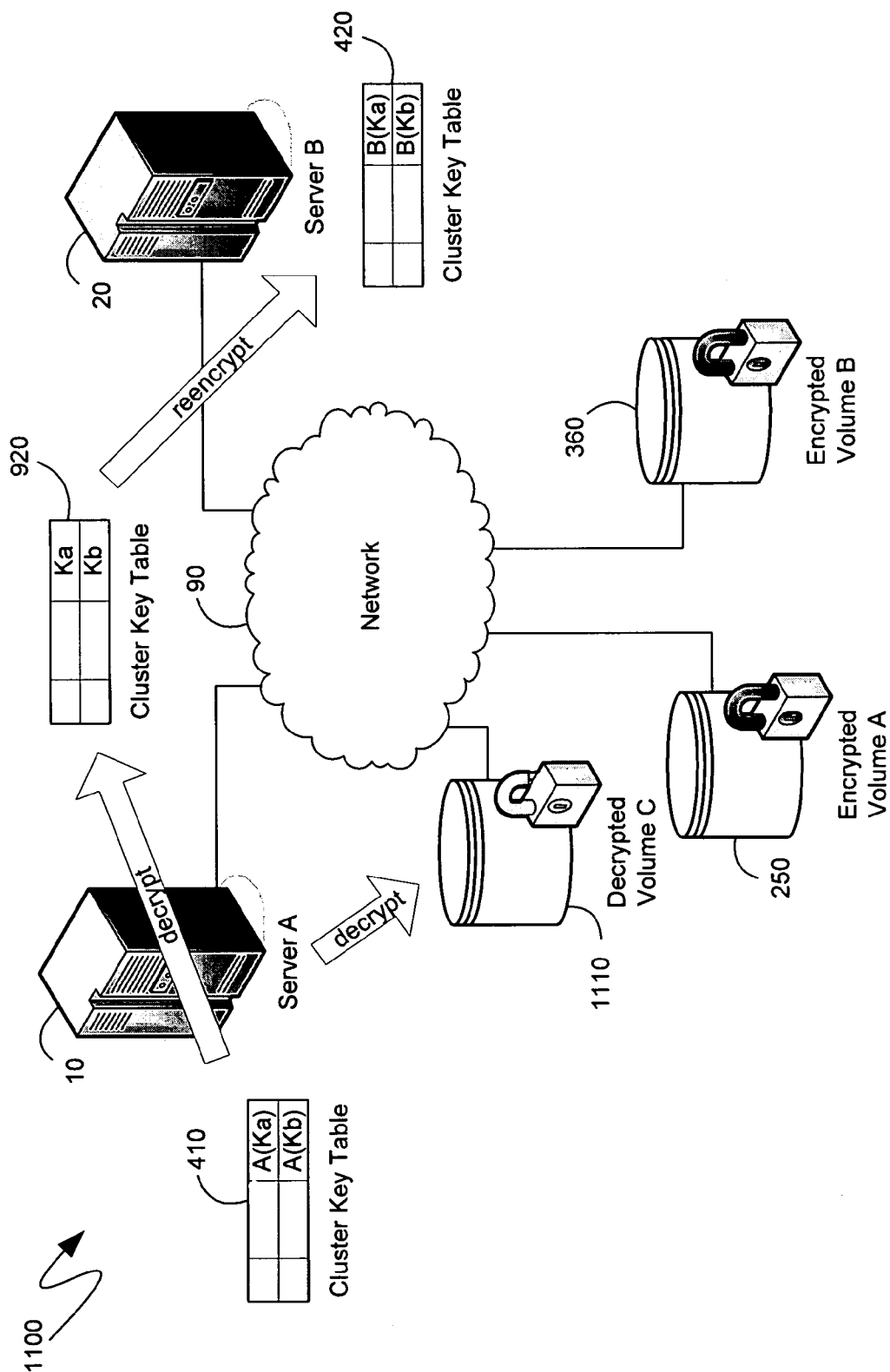
FIG. 12 is a block diagram of an exemplary decryption of a full volume encrypted volume in a clustered environment utilizing a table structure for storing decryption keys.

The decryption of an encrypted clustered volume can be similar to the above described and illustrated removal of a clustered encrypted volume. Turning to FIG. 12, the system 1100 illustrates the decryption of encrypted volume C 555 into decrypted volume C 1110. As shown, a decrypted volume, such as decrypted volume C 1110, does not require a key for access and, consequently, the relevant entry from a CKT, such as CKT 510, can be removed by, for example, server A 10, resulting in the previous CKT 410. Such a change to the CKT can then be propagated to the other computing devices of the cluster through the manner described above, and illustrated in FIG. 12, namely via the decrypted version of the CKT 920 or through an identification of the removed entries.

Figure 13:
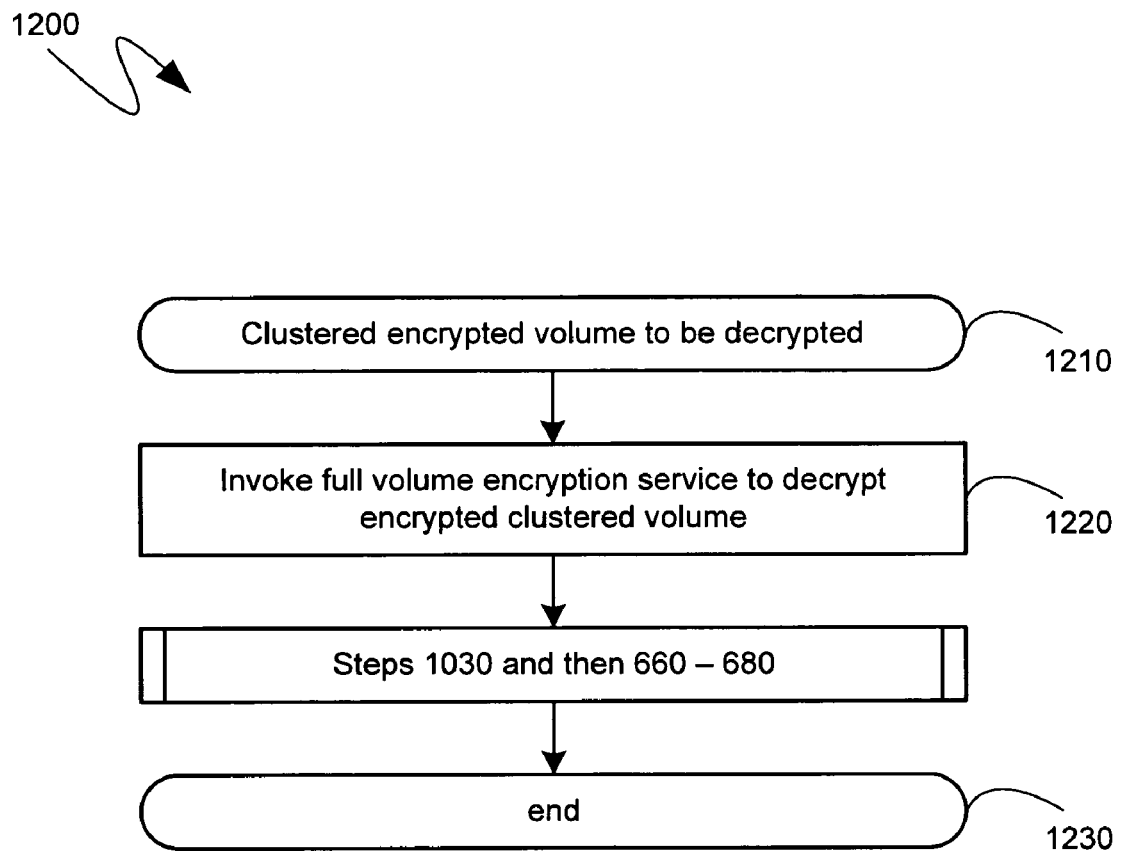
FIG. 13 is a flow diagram of an exemplary decryption of a full volume encrypted volume in a clustered environment utilizing a table structure for storing decryption keys.
Figure 14:
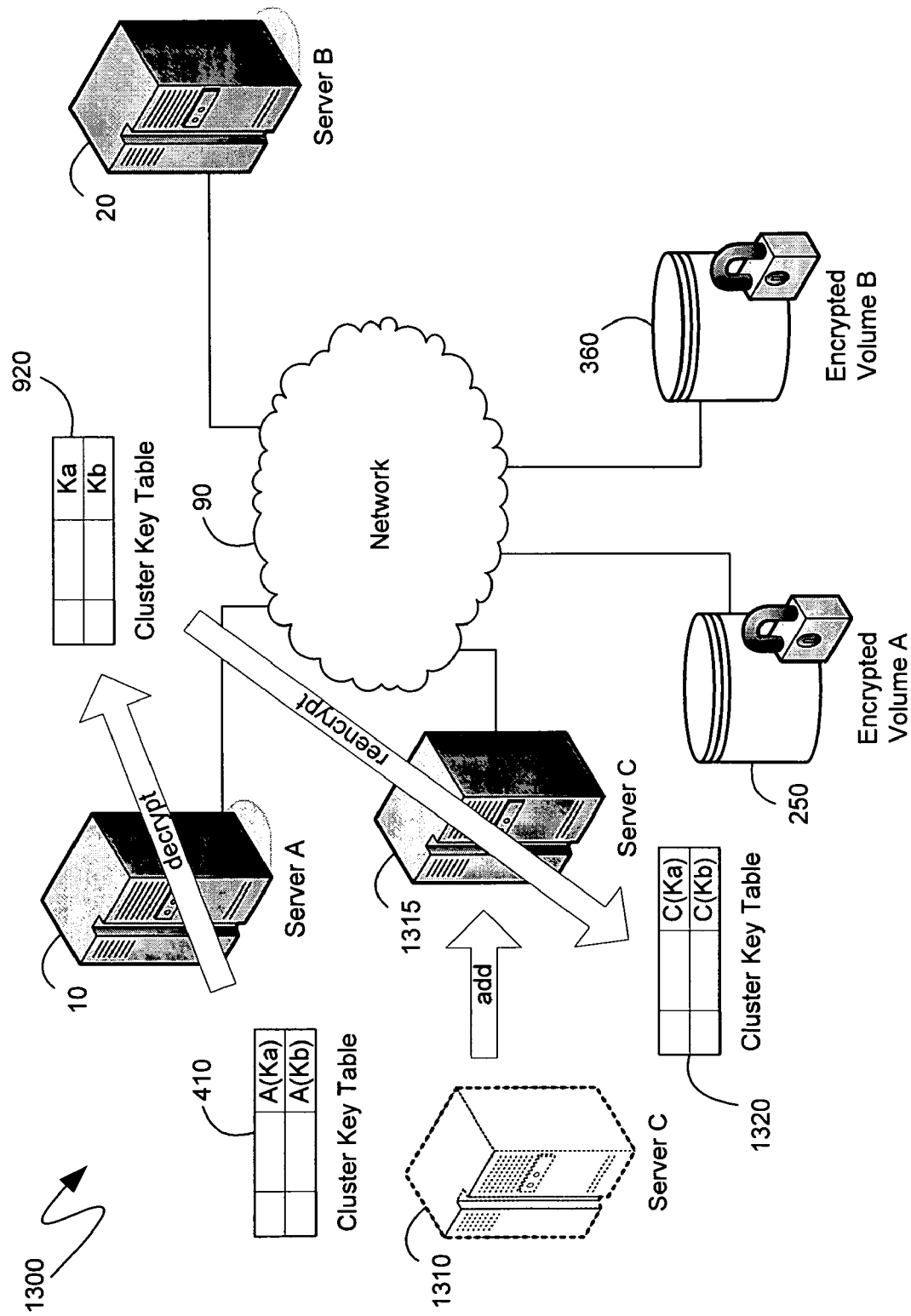
FIG. 14 is a block diagram of an exemplary addition of a computing device to a clustered environment utilizing a table structure for storing decryption keys.

FIG. 13 contains a flow diagram 1200 illustrating the steps of decrypting an encrypted clustered volume. As shown, at step 1210, an encrypted clustered volume can be selected for decryption and, subsequently, at step 1220, a service, such as a full volume encryption service, can be invoked to decrypt the encrypted clustered volume. The removal of an entry from the CKT, as described above with reference to step 1030, can then be performed, as can the updating of the CKT to other computing devices, as previously described with reference to steps 660 through 680, or through the indication of the removed entries, as also described previously. The relevant processing can then end at step 1230.

Should a new computing device be added to a cluster having encrypted clustered volumes, such a new device can be provided with a copy of the CKT in a manner similar to that described above. Specifically, turning to the system 1300 of FIG. 14, a new computing device, such as server C 1310, can be connected to the network 90 and added to the cluster to become clustered server C 1315. In such a case, the clustered server C 1315 can be provided with a copy of the CKT from any of the other computing devices of the cluster. In the illustrated example of FIG. 14, the server A 10 can request that the full volume encryption mechanisms decrypt the keys in the CKT 410, yielding an in-memory copy CKT 920 with decrypted keys, which can then be transmitted or provided to the server C 1315. Server C 1315 can then reencrypt those keys with its own key, such as its own GAUK, described above, yielding CKT 1320, where each of the keys, shorthanded "Ka" and "Kb" can be encrypted by the server C specific key, resulting in encrypted keys that are shorthanded "C(Ka)" and "C(Kb)" in FIG. 14.

Figure 15:
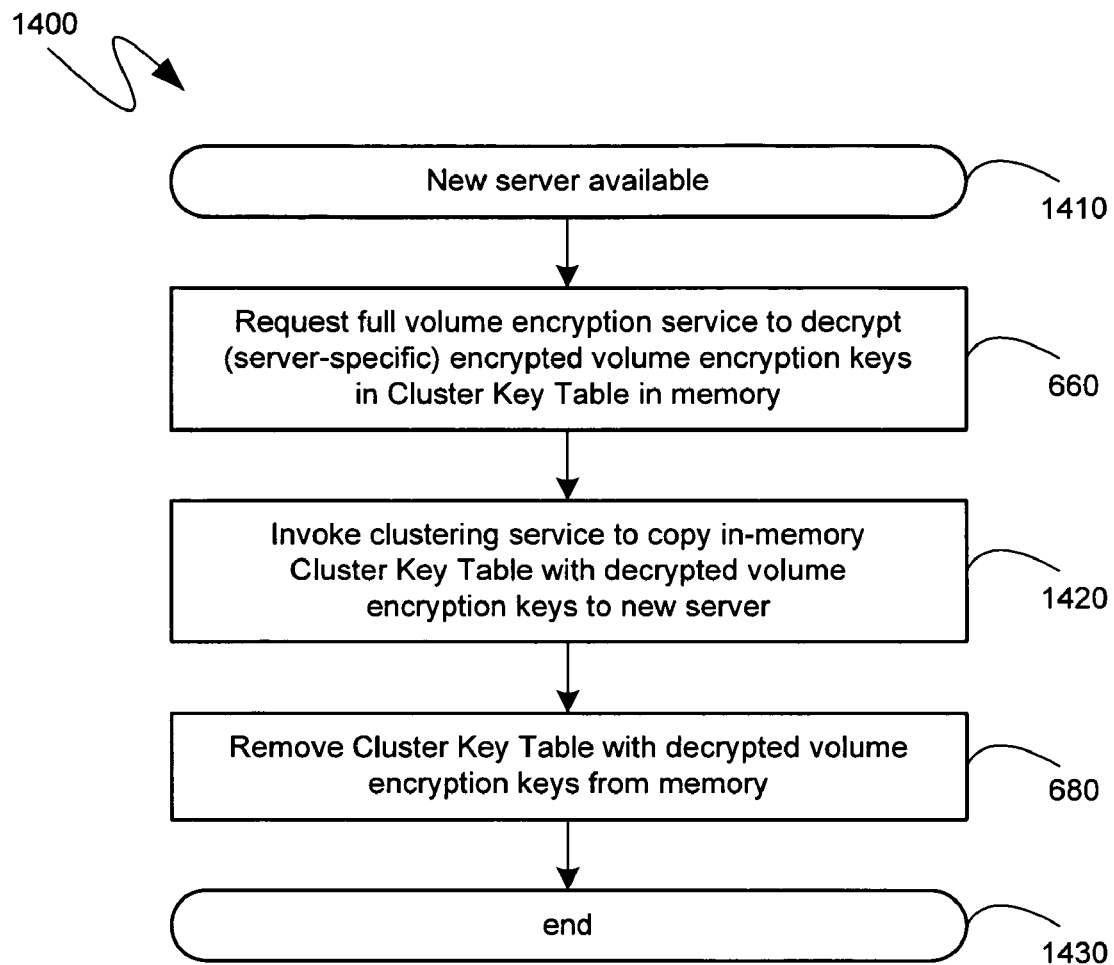
FIG. 15 is a flow diagram of an exemplary addition of a computing device to a clustered environment utilizing a table structure for storing decryption keys.

Flow diagram 1400 of FIG. 15 illustrates the above addition of a new computing device to a cluster with greater detail. Initially, as shown, at step 1410, a new computing device, such as a new server, can become available. Such availability can include steps by the new computing device to join the cluster, such as the provision of relevant information to the operating system of the new computing device. Subsequently, to provide the new computing device with a copy of the CKT, a computing device, such as one polled by the new computing device, can, at step 660, as described previously, request a full volume encryption service to decrypt some or all of the encrypted keys in the CKT. Once the decrypted version of the CKT is available, at step 1420, the computing device can request the clustering service to send the decrypted CKT to the new computing device, such as through a checkpointing service. The decrypted CKT can then be removed at step 680 for security purposes, as previously indicated, and, at step 1430, the relevant processing can end.

While the above descriptions focused on the maintenance of a CKT during changes to the clustering environment, the CKT itself can be expanded to provide for the retention of information beyond that previously indicated. Specifically, in one embodiment, the CKT can be expanded to comprise other access control entities. For purposes of description, the term "access control entity" will be utilized, and is defined herein, as being any entity or object that controls access to a particular volume. Thus, the keys described above are access control entities, as are other access control requirements, such as those described below. As will be known by those skilled in the art, the granting of access to the data stored on an encrypted volume can be limited, not only by the provision, or accessing, of a specific key, but also by other factors. As indicated previously, the VMK can be protected by a key that is associated with a password, PIN, keycard or like security information. However, the use of the VMK to access the FVEK and, ultimately, the data on the encrypted volume, can be limited by other logical constructions. For example, a VMK may be utilized to unlock an FVEK only if, not only is the proper password for the VMK provided, but also if a recovery password for the FVEK exists. If such a recovery password has not been established, then even the provision of a proper password that can access the VMK will not result in access to the encrypted data of the volume, because a full volume encryption system, for example, can choose not to decrypt the FVEK absent this recovery password. In another example, the VMK can be unlocked by either a password or a keycard, but, if a keycard is used, a PIN has to be provided as well.

Such logical constructs limiting access to an encrypted volume, or similar access control requirements, can, in one embodiment, be accounted for and retained in the CKT. Specifically, additional columns can be added to the CKT to account for such information, where each column can specify a particular access control requirement that is to be met before access can be granted to the encrypted data volume with which that access control requirement is associated. Should multiple access control requirements simultaneously need to be met in order for access to be granted, additional columns can be provided.

Alternative access control requirements can be accounted for in a CKT, in one embodiment, by assigning multiple entries to a single volume. For example, if an encrypted volume could be accessed if an emergency password was set or if a keycard was provided, the CKT can comprise one entry for the encrypted volume specifying, together with an identification of the volume and an encrypted version of a key associated with the volume, an indication that access is to be granted only if an emergency password is set. A second, independent, entry in the CKT can identify the same encrypted volume, with the same encrypted version of a key associated with that volume, except that this second entry can specify that access is to be granted only if a keycard was provided. If either entry enables access to the encrypted volume, then access is granted. Consequently, multiple independent entries in the CKT can provide for alternative access control requirements.

As can be seen from the above descriptions, the maintenance and utilization of a tabular structure for retaining access information for encrypted volumes within a clustered environment have been presented. In view of the many possible variations of the subject matter described herein, we claim as our invention all such embodiments as may come within the scope of the following claims and equivalents thereto.

We claim:

1. One or more computer-readable storage media comprising computer-executable instructions for sharing a cluster key table, the computer-executable instructions directed to steps comprising:

receiving a first key associated with an encrypted volume that was added to a cluster of computing devices, the first key enabling the computer-executable instructions to decrypt the encrypted volume, the first key being received as an encrypted first key which can be decrypted by a second key that is specific to a computing device that is executing the computer-executable instructions, the computing device being one of the cluster of computing devices;

adding an entry corresponding to the encrypted volume to a locally-maintained version of the cluster key table, the entry comprising an identification of the encrypted volume and the encrypted first key;

requesting decryption of the encrypted first key;

generating a version of the cluster key table for sharing with other computing devices of the cluster of computing devices, the version of the cluster key table for sharing comprising an entry corresponding to the encrypted volume, the entry comprising the identification of the encrypted volume and the decrypted first key;

requesting transmission of the version of the cluster key table for sharing to at least one other computing device of the cluster of computing devices; and discarding the version of the cluster key table for sharing.

2. The computer-readable storage media of claim 1, comprising further computer-executable instructions directed to: receiving a newer copy of at least a portion of the cluster key table comprising decrypted keys associated with encrypted volumes available to the cluster of computing devices; requesting encryption of the decrypted keys with the second key; and storing the newer copy of the at least the portion of the cluster key table with the replaced keys.

3. The computer-readable storage media of claim 1, wherein the first key associated with the encrypted volume automatically decrypts a third key associated with the encrypted volume, the third key enabling the computer-executable instructions to access data on the encrypted volume.

4. The computer-readable storage media of claim 1, comprising further computer-executable instructions directed to storing the locally-maintained version of the cluster key table in an operating system registry, wherein the requesting transmission of the version of the cluster key table for sharing comprises utilizing a checkpoint service.

5. The computer-readable storage media of claim 1, comprising further computer-executable instructions directed to removing the entry from the locally-maintained version of the cluster key table to generate a second locally-maintained version of the cluster key table and communicating the removal of the entry to the at least one other computing device of the cluster of computing devices.

6. The computer-readable storage media of claim 1, comprising further computer-executable instructions directed to receiving a request from a new computing device joining the cluster of computing devices, wherein the computer-executable instructions directed to the requesting the decryption, the generating the version of the cluster key table for sharing, and the requesting the transmission comprise computer-executable instructions for requesting the decryption, the generating the version of the cluster key table for sharing, and the requesting the transmission in response to the receipt of the request from the new computing device joining the cluster of computing devices.

7. The computer-readable storage media of claim 1, wherein the locally-maintained version of the cluster key table comprises another entry comprising an identification of another encrypted volume and another encrypted key, the other encrypted key also being encrypted by the second key.

8. The computer-readable storage media of claim 1, wherein the entry further comprises at least one access control requirement limiting access to the data on the encrypted volume.

9. The computer-readable storage media of claim 8, wherein the cluster key table comprises multiple entries corresponding to the encrypted volume, each of the multiple entries comprising alternative access control requirements limiting access to the data on the encrypted volume.

10. A method for sharing a cluster key table, the method comprising the steps of:

receiving a first key associated with an encrypted volume that was added to a cluster of computing devices, the first key enabling the computer-executable instructions to decrypt the encrypted volume, the first key being received as an encrypted first key which can be decrypted by a second key that is specific to a computing device that is executing the computer-executable instructions, the computing device being one of the cluster of computing devices;

adding an entry corresponding to the encrypted volume to a locally-maintained version of the cluster key table, the entry comprising an identification of the encrypted volume and the encrypted first key;

requesting decryption of the encrypted first key;

generating a version of the cluster key table for sharing with other computing devices of the cluster of computing devices, the version of the cluster key table for sharing comprising an entry corresponding to the encrypted volume, the entry comprising the identification of the encrypted volume and the decrypted first key;

requesting transmission of the version of the cluster key table for sharing to at least one other computing device of the cluster of computing devices; and discarding the version of the cluster key table for sharing.

11. The method of claim 10, further comprising the steps of: receiving a newer copy of at least a portion of the cluster key table comprising decrypted keys associated with encrypted volumes available to the cluster of computing devices; requesting encryption of the decrypted keys with the second key; and storing the newer copy of the at least the portion of the cluster key table with the replaced keys.

12. The method of claim 10, further comprising the steps of: removing the entry from the locally-maintained version of the cluster key table to generate a second locally-maintained version of the cluster key table and communicating the removal of the entry to the at least one other computing device of the cluster of computing devices.

13. The method of claim 10, wherein the cluster key table comprises multiple entries corresponding to the encrypted volume, each of the multiple entries comprising alternative access control requirements limiting access to the data on the encrypted volume.

14. The method of claim 10, wherein the locally-maintained version of the cluster key table comprises another entry comprising an identification of another encrypted volume and another encrypted key, the other encrypted key also being encrypted by the second key.

15. A system comprising:
a first computing device;
a first encrypted volume; and
a second computing device, the second computing device comprising one or more computer-readable storage media comprising computer-executable instructions directed to steps comprising:
receiving a first key associated with the first encrypted volume, the first key enabling the second computing device to decrypt the encrypted volume, the first key being received as an encrypted first key which can be decrypted by a second key that is specific to the second computing device;

adding an entry corresponding to the first encrypted volume to a locally-maintained version of a cluster key table, maintained locally on the second computing device, the entry comprising an identification of the first encrypted volume and the encrypted first key;

requesting decryption of the encrypted first key;

generating a version of the cluster key table for sharing with the first computing devices, the version of the cluster key table for sharing comprising an entry corresponding to the first encrypted volume, the entry comprising the identification of the first encrypted volume and the decrypted first key;

requesting transmission of the version of the cluster key table for sharing to the first computing device; and discarding the version of the cluster key table for sharing.

16. The system of claim 15, wherein the first computing device comprises one or more computer-readable storage media comprising computer-executable instructions directed to steps comprising: receiving the version of the cluster key table for sharing from the second computing device; generating a version of the cluster key table for local storage on the first computing device by requesting encryption of the decrypted first key with a third key that is specific to the first computing device; and storing the version of the cluster key table for local storage on the first computing device.

17. The system of claim 15, wherein the one or more computer-readable storage media of the second computing device comprise further computer-executable instructions directed to removing the entry from the locally-maintained version of the cluster key table to generate a second locally-maintained version of the cluster key table and communicating the removal of the entry to the first computing device.

18. The system of claim 15, further comprising a third computing device; wherein the one or more computer-readable storage media of the second computing device comprise further computer-executable instructions directed to receiving a request from the third computing device upon the third computing device joining the system; and wherein further the computer-executable instructions directed to the requesting the decryption, the generating the version of the cluster key table for sharing, and the requesting the transmission comprise computer-executable instructions for requesting the decryption, the generating the version of the cluster key table for sharing, and the requesting the transmission in response to the receipt of the request from the third computing device.

19. The system of claim 15, wherein the cluster key table comprises multiple entries corresponding to the encrypted volume, each of the multiple entries comprising alternative access control requirements limiting access to the data on the encrypted volume.

20. The system of claim 15, wherein the locally-maintained version of the cluster key table comprises another entry comprising an identification of another encrypted volume and another encrypted key, the other encrypted key also being encrypted by the second key.

* * * * *